Patented Sept. 11, 1934

1,973,647

UNITED STATES PATENT OFFICE 1,973,647

PROCESS OF SYNTHETICALLY PRODUCING EPHEDRIN HOMOLOGUE AND ITS SALTS

Chogi Nagai, deceased, late of Shibuya-Machi, Toyotama-Gun, Tokyo, Japan, by Alexander Nagai, heir, Berlin, Germany No Drawing. Application March 6, 1930, Serial No. 433,816. In Japan August 6, 1929

2 Claims. (Cl. 260—128.5)

This invention relates to the process of synthetically producing ephedrin homologue and its salts, resembling in its chemical and biological action, ephedrin which is obtainable by reducing, in the presence or absence of formaldehyde, nitro-alcohol obtained by the condensation of benzaldehyde with nitro-ethane in the presence of alkali and the object of the invention is to produce a substitute for natural or synthetic ephedrin, economically.

The following data are given by way of examples according to this invention.

EXAMPLE I

*1-phenyl-2-amino-ethan-1-ol*

$C_6H_5$—CH(OH)—$CH_2NH_2$.

A condensation product formed by agitating 106 grams of benzaldehyde and 61 grams of nitro-methane with 60 c. c. of potassium bicarbonate solution for several hours, is dissolved in ether and is shaken with sodium bisulphite solution, and is then shaken with an alkali metal carbonate solution. The ether is distilled away from the ethereal solution which leaves phenyl-nitro-ethanol, the yield of which is from 75% to 80% of the thereotical.

An alcoholic solution of 167 grams of phenyl-nitroethanol, formed by the above mentioned process, dissolved in 800 c. c. of alcohol, is reduced by adding 1600 grams of 25% sulphuric acid and 240 grams of iron filings alternately, and the iron sulphate thus formed is then precipitated by means of alcohol. The alcoholic solution is made alkaline by adding potassium carbonate to it, then the upper layer is separated from the lower layer, and is neutralized by adding sulphuric acid, thus precipitating potassium sulphate which is filtered off. When the alcohol in the filtrate is distilled away, and the residue is crystallized from alcohol by recrystallization, a sulphate of rhombic tabular form is obtained. When to this aqueous solution, caustic soda is added and is shaken with ether, and the ether is then distilled away from this ethereal solution, a base shown in the title of this example having a melting point of about 40° C. remains.

EXAMPLE II

*1-phenyl-2-methyl-amino-ethan-1-ol*

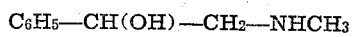

$C_6H_5$—CH(OH)—$CH_2$—$NHCH_3$

A mixture of one molecule of phenyl-nitroethanol described in the Example I and one molecule of formaldehyde is reduced by means of excess zinc dust, and 30% acetic acid, and the zinc is then removed by flowing hydrogen sulphide therein, and a small quantity of neutral substance and acetic acid is dissolved and passed into ether. When the two layers are separated from each other, and hydrochloric acid is added to the aqueous solution, which is then evaporated under diminished pressure, a chloride remains which crystallizes out from solution in a small quantity of an absolute alcohol. After treating this chloride in the same manner as described in the preceding example, a base shown in the title of this example having a melting point of 77° C. is obtained.

EXAMPLE III

*1-phenyl-2-amino-4-methyl-pentan-1-ol*

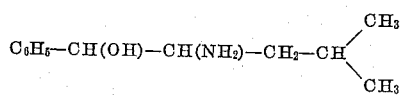

170 grams of light-colored, oily, crude phenyl-nitro-methyl-pentanol are obtained by treating in the same manner as above described, a condensation product formed by shaking 106 grams of benzaldehyde, 117 grams of nitro-isopentane and 100 c. c. of 40% potassium carbonate solution for about 4 weeks.

This condensation product is reduced by means of alcohol, iron filings, and 30% sulphuric acid as described above, then the iron sulphate thus formed is precipitated by alcohol, filtered off, and then the residue obtained by distilling off alcohol from the solute is made strongly alkaline by adding caustic soda thereto, shaken with ether, and then the ether is removed by distillation. When this residue is evaporated under diminished pressure, a tabular or flat needle-like chloride is obtained, by neutralizing a free base having a boiling point of from 170° to 172° C. (18 mm.) by alcoholic hydrochloric acid, and then adding ether. A base shown in the title of this example is obtained by treating the above mentioned chloride in the same manner as the Example 1.

The U. S. Patent No. 1,356,877 relates to the process of producing methyl-mydriatin or artificial ephedrin by reducing phenyl-nitro-propanol obtained from benzaldehyde and nitro-ethane by the action of a solution of weak alkaline organic or inorganic substance, such as alkali metal carbonates, bicarbonates, phosphates, or pyridine etc., in the presence of formaldehyde solution, with acetic acid or iron dust.

This invention employs the above patent, as this invention is an improvement of the process of said patent, and is a process of producing ephedrin homologue and its salts in which nitroparaffine of the 1 carbon or 5 carbon nucleus other than nitroethane instead of nitroethane is used.

What is claimed is:

1. The method of synthetically producing ephedrine homologue, resembling ephedrine in its chemical and biological action, by reducing the nitro-alcohol obtained by the condensation of benzaldehyde with a nitroparaffine selected from the group consisting of nitromethane and nitro-iso-pentane, in the presence of alkali metal carbonate.

2. The method of synthetically producing ephedrine homologue, resembling ephedrine in its chemical and biological action by reducing, in the use of formaldehyde, the nitro-alcohol obtained by the condensation of benzaldehyde with a nitroparaffine selected from the group consisting of nitromethane and nitro-iso-pentane, in the presence of alkali metal carbonate.

ALEX. NAGAI,
*Heir to the Late Chogi Nagai.*